(12) United States Patent
Martin

(10) Patent No.: US 7,178,408 B2
(45) Date of Patent: Feb. 20, 2007

(54) SODAR SOUNDING OF THE LOWER ATMOSPHERE

(75) Inventor: Andrew Louis Martin, Ferny Creek (AU)

(73) Assignee: Tele-IP Limited, Victoria (AU)

(*) Notice: Subject to any disclaimer, the term of this patent is extended or adjusted under 35 U.S.C. 154(b) by 0 days.

(21) Appl. No.: 10/547,117

(22) PCT Filed: Feb. 26, 2004

(86) PCT No.: PCT/AU2004/000242

§ 371 (c)(1),
(2), (4) Date: Aug. 26, 2005

(87) PCT Pub. No.: WO2004/077094

PCT Pub. Date: Sep. 10, 2004

(65) Prior Publication Data

US 2006/0162440 A1 Jul. 27, 2006

(30) Foreign Application Priority Data

Feb. 26, 2003 (AU) .............................. 2003900878

(51) Int. Cl.
*G01F 1/66* (2006.01)
(52) U.S. Cl. ..................................... 73/861.25; 367/87
(58) Field of Classification Search ............. 73/861.25; 367/87, 89
See application file for complete search history.

(56) References Cited

U.S. PATENT DOCUMENTS 4,158,401 A * 6/1979 Matsumoto et al. ........ 181/210
5,142,504 A * 8/1992 Koster et al. ............ 379/88.16
6,987,707 B2 * 1/2006 Feintuch et al. .............. 367/99
7,106,656 B2 * 9/2006 Lerro et al. .................... 367/99
2003/0056591 A1 * 3/2003 Martin ......................... 73/602
2004/0252586 A1 * 12/2004 Martin ......................... 367/89
2005/0232082 A1 * 10/2005 Martin ....................... 367/129

FOREIGN PATENT DOCUMENTS

WO          WO 94/10583        5/1994
WO          WO 01/67132 A1     9/2001

* cited by examiner

Primary Examiner—Edward Lefkowitz
Assistant Examiner—Andre Allen
(74) Attorney, Agent, or Firm—Hovey Williams LLP

(57) ABSTRACT

A method and system for acoustically sounding the lower atmosphere involves the transmitting of an acoustic chirp and the processing of returned echoes and interference using wavelet and matched filter techniques. A single transmitter and four receivers may be used, with receivers located equidistant from the transmitter on the cardinal points of the compass. N, S, E, & W inputs are digitized and input to a wavelet filter (50) together with the transmitter chip signal (R or D) for the attenuation of the direct signal and ambient noise signals. The interference-attenuated signals are then processed in a matched filter (52) to extract phase and amplitude outputs (54 and 56), the phase output being unwrapped (70). The N and S phase signals and the E and W phase signals are then separately differenced (74 and 80) and the results used to compute (86 and 92) wind speed and bearing. Extracted amplitude signals (56) are put through a second wavelet filter (58) to remove echo clutter before being stored, along with the wind speed and bearing data in a range gate (96).

13 Claims, 11 Drawing Sheets

Return signal amplitude showing removal of clutter returns.

With clutter returns at 190m and 320m

Clutter returns at 190m and 320m removed

SODAR SOUNDING OF THE LOWER ATMOSPHERE

TECHNICAL FIELD

This invention relates to sodar methods and apparatus for sounding in the lower atmosphere using separate acoustic transmitters and receivers.

The present invention Is applicable to 'monostatic' and 'bistatic' sodar systems. Monostatic systems are those in which the transmitter and receiver are co-located, often on the same reflector dish. Bistatic systems are those where the transmitter and receiver are not co-located but are spaced apart by a distance that is usually greater than sounding range, rather than a very small fraction of the range distance.

The atmospheric sounding techniques of the invention belong to a class of technology recently dubbed SODAR, or SOund Direction and Ranging. Sodar is to be distinguished from sounding techniques using electromagnetic waves, such as RADAR (Radio Direction and Ranging), LIDAR (Light Direction and Ranging), AERI (Atmospheric Emittance Radiance Interferometry) and the hybrid RASS, (Radio Acoustic Sounding Systems) in the atmosphere. However, common to all these techniques in their current form is a concern with Doppler signals and the use of Fourier transform methods in processing such signals. While SONAR (SOund Navigation and Ranging) has not been mentioned because it is employed in liquid media, some overlap between the exclusively acoustic techniques of sonar and sodar may be seen because sonar ranging and imaging methods have been applied outside the marine environment—as in some camera ranging, non-destructive testing and medical imaging systems.

BACKGROUND TO THE INVENTION

Though exclusively acoustic methods for wind profiling and the like have a long history, Coulter & Kallistratova in their 1999 review article "The Role Acoustic Sounding in a High-Technology Era" [Meteorol. Atmos. Phys. 71, 3–19] show that their performance has not been satisfactory, largely due to an Inability to achieve an adequate signal-to-noise ratio [s/n].

In recent years, radar DSP (digital signal processing) techniques have been applied to the sodar to achieve improved s/n. In particular, pulse-compression techniques have been used, in which the echoes from a phase or frequency coded acoustic pulse are processed with matched filters using Fourier transforms to give the range resolution normally associated with a shorter pulse with a much higher peak power. Such coded pulses are said to have 'pulse-compression' waveforms or to be 'pulse coded'. [For short, pulses of this type will be called 'chirps' herein.] In an article entitled: "Use of Coded Waveforms for SODAR Systems" [Meteorol. Atomos. Phys. 71, 15–23 (1999)], S G Bradley recently reviewed, with simulations, the use of radar pulse compression techniques to improve amplitude discrimination in sodar. Examples of the use of pulse compression techniques in radar can be found in U.S. Pat. No. 6,208,285 to Burkhardt, U.S. Pat. No. 6,087,981 to Normat et al, and U.S. Pat. No. 6,040,898 to Mroski et al. Despite the application of such sophisticated techniques to sodar, a review by Crescenti entitled, "The Degradation of Doppler Sodar Performance Due to Noise" [Crescenti, G. H., 1998, Atmospheric Environment, 32, 1499–1509], found that severe problems remained even at modest ranges of 1500 m.

In our copending International patent application PCT/AU01/00247 [WO 01/67132] we disclosed sodar systems using long chirps of tens of seconds in duration, in which systems echoes from each chirps were detected while the transmission of the chirp was still continuing. [Such systems can be termed 'listen-while-sending' systems and are to be contrasted with the conventional 'send-then-listen' systems characteristic of both prior radar and sodar art.] Fourier-based pulse-compression techniques were used in our prior application to extract the desired faint echo signals from interference, which includes the direct signal that Is received directly from transmitter during transmission. In that copending application we indicated that linear acoustic chirps in the frequency range of 500 to 5000 Hz were suitable. We also disclosed the use of over-sampling; that is, the use of sampling rates well in excess of the Nyquist frequencies for chirp tones.

While the combination of the above characteristics of the system of our copending application served to greatly improve s/n with respect to the art, the use of long chirps and listening-while-sending created special challenges relating to interference removal so as to reveal fine-scale discontinuities in the lower atmosphere. There are three primary components of interference—the direct signal, ambient noise and signal clutter. Ambient is of three types: 'noise spikes' caused by short loud noises such as fire-crackers or gun-shots, cars back-firing and the like; background noise such as traffic hiss and rumble; and acoustic echoes of the transmitted chirp returned from fixtures such as nearby buildings. Clutter refers to echoes returned from moving objects, such as flocks of birds or waving trees, which are not of interest. It will be appreciated that, unlike conventional short-pulse send-then-listen radar and sodar, the long listening times that we prefer mean that a lot of noise is collected.

While monostatic sodar systems can be made compact and conveniently portable, especially where the transmitter and receiver are mounted on the same dish or mechanical structure, direct signal interference is a severe problem in listen-while-sending systems because of its large amplitude with respect to echoes. Also, with monostatic systems it is most difficult to separate returned Doppler components due to horizontal and vertical wind speed. These problems are much less intrusive in bi-static systems where the receiver is well removed from the transmitter thereby greatly reducing the direct signal and, because of the use of small angles of reflection/refraction, Doppler signals due to horizontal wind are naturally favored over those due to vertical windspeed. However, such bistatic systems suffer badly from propagation losses due to the much longer signal path compared with monostatic systems that are pointed substantially vertically.

U.S. Pat. No. 2,507,121 to Sivian [1950] disclosed a short-pulse, send-then-listen, monostatic acoustic system for detecting the height of atmospheric discontinuities. In the embodiment of most interest here, two receivers (microphones) were used, one being shielded from returned echoes and the other not. The two receivers were connected so that their outputs were opposed and the net signal was displayed on an oscilloscope. In the event of a normally returned echo, a pip is displayed because only the second receiver detects a signal. However, in the event of a local gunshot during the listening time, both receivers detect the same signal and no pip is displayed.

U.S. Pat. No. 3,675,191 to McAllister [1972] disclosed a short-pulse, send-then-listen, monostatic, sodar system using four adjacent arrays of acoustic transducers capable of being used as speakers and microphones, the arrays being aligned with the cardinal points of the compass and being shielded from one another, except at their upper faces. Short acoustic pulses were transmitted vertically upwards and the relative timing of the returned echoes at each of the four arrays gave the height and bearing of wind layers. [It might be noted that the physics of acoustic sounding was well documented in 1969 by McAllister and others in "Acoustic Sounding—A New Approach to the Study of Atmospheric Structure" in Proc. IEEE Vol. 57, 579–587.] A similar system was disclosed by U.S. Pat. No. 4,558,594 to Balser where an acoustic phased array was used that was capable of directing successive pulses in different directions, the echoes from one pulse being detected by the array before the next was transmitted. U.S. Pat. No. 5,521,883 to Fage et al used a phased array to send pulses of different frequencies in different directions and then listen for all echoes simultaneously, thereby decreasing the cycle time. The typical angle of elevation for pulse transmission in the latter systems was between 20 and 30 degrees. The relatively low elevation angles enhanced Doppler components in the returned echoes due to horizontal rather than vertical wind speed but suffered from serious propagation attenuation.

In U.S. Pat. No. 6,097,669 Jordan teaches the transmission of a high-powered short-duration acoustic pulse consisting of a string of concatenated wavelets in a send-then-listen system. The echoes are sampled and range-gated. An amplitude peak surrounding the frequency of the transmitted sound is observed for each range gate and used to derive wind velocity at the altitude concerned using wavelet coefficients and inverse wavelet transforms. This patent makes reference to a publication by Jordan et al entitled, Removing Ground and Intermittent Clutter Contamination from Wind Profiler Signals using Wavelet Tansforms [Mar. Vol. 14 Journal of Atmospheric and Oceanic Technology, 1280–1297] that relates to radar rather than sodar methods. Similarly, earlier disclosures by Jordan, as in U.S. Pat. No. 5,592,171, relate to wavelet methods for use in [send-then-listen] radar wind profiling where discrimination against clutter and variable noise is claimed. In U.S. Pat. No. 5,686,919 Jordan disclosed somewhat similar polynomial techniques for removing broadband clutter from radar send-then-listen systems. Such clutter removal methods are, however, quite unsuited for systems using long chirped pulses and listening while sending.

OUTLINE OF THE INVENTION

From one aspect, the invention comprises methods and systems for acoustically sounding the lower atmosphere by transmitting a chirp down-range into the atmosphere, detecting echoes from the chirp while it is being transmitted along with interference including the direct signal, ambient noise and echo clutter, and extracting echo amplitude and/or phase data from the transmitted chirp using matched filter techniques relating received signals to the waveform of the transmitted chirp. Preferably, multiple receivers are employed in association with a single transmitter and phase data from two opposed receivers are differenced to yield wind speed in the azimuth direction of the receivers and thereby mitigating the effect of vertical wind speed, which is likely to be common to the signals received by each receiver. If four receivers are employed on the cardinal points of the compass around the transmitter, differencing of each pair of opposed receivers in this way allows wind speed and bearing to be calculated.

From another aspect, the invention comprises methods and systems of the general type indicated in which wavelet filtering methods are used to attenuate direct signal interference by subtracting wavelet transforms of the direct signal (derived from the transmitter or from a dummy receiver shielded from echoes but not interference) from wavelet transforms of the received signal and then performing an inverse wavelet transformation to generate an interference-attenuated signal for input to the matched filter. This wavelet filter may also be used to attenuate ambient noise interference by identifying and clipping anomalous noise spikes revealed by the wavelet transform of the receiver input signal.

From another aspect, the invention comprises methods and systems of the general type indicated in which wavelet filtering methods are used to attenuate clutter interference in the amplitude data or signals extracted by the use of the matched filter. This is done by taking the wavelet transform of the extracted amplitude signal and clipping anomalous noise made evident in the wavelet domains, before performing the inverse wavelet transform to generate the clean amplitude signals.

It will be appreciated that digital methods will generally be employed in the signal manipulations indicated. That is analog received signals will be sampled, digitized converted into digital sample streams. However, in some manipulations, such as taking the Fourier transforms (normal and inverse) required by a matched filter, it may be necessary to take the transform a whole sample stream instead of attempting sample-by-sample transformation. Other manipulations, such as differencing two sample streams or taking wavelet transforms can be done, at least in part, sample-by-sample basis. These matters will be familiar to those skilled in the DSP art.

To maximize s/n it is preferred to employ chirps having a duration of tens of seconds and to listen for long enough to ensure that there is opportunity for a complete echo to be returned from the maximum altitude of interest. For the same purpose it is desirable to use sampling rates at least ten times the Nyquist rate. The limits on chirp duration and sample rate will usually be determined by processing capacity.

While a variety of pulse-compression waveforms are known in the art and can be used in this invention, we prefer (but are not limited to) the use of linear chirps that span about 200 Hz to 1500 Hz. Since special acoustic transducers are needed to generate chirps that extend below about 500 Hz, and as propagation of acoustic waves in the atmosphere falls of rapidly at above about 1500 Hz, we have found it convenient to use linear chirps that range between about 500 Hz to about 1400 Hz. As already noted, the use of multiple acoustic receivers with a single transmitter can be employed to further reduce undesired echo signals by subtracting or adding the phase and/or amplitude outputs from the matched filter. In this way, vertical wind components can be accentuated while discounting horizontal components or vise versa.

Preferably, but not essentially, the matched filters employed herein are of the complex type, requiring the conversion of received (and reference chirp) signal streams into real and imaginary streams. This may be achieved by Sine and Cosine methods known in the art.

Whether multiple receivers are used or not, it is preferable to normalize the amplitude of the returned echoes (before or after Fourier and/or wavelet processing) to compensate for propagation loss in the atmosphere. This can be done by increasing the amplitude of returned echoes in a manner that varies logarithmically with the time interval between transmission and echo return; that is, in a manner that varies logarithmically with the distance of the atmospheric anomaly generating the echo from the transmitter and receiver. More particularly, we have found it effective to increase the amplitude of the derived amplitude signal according to the function: A.Log(d)-B, where A and B are constants and d is the distance from transmitter to receiver via the anomaly calculated from the echo delay and the speed of sound in air. We have found useful values for A to be between 8 and 14 (inclusive) and useful values for B to be between 60 and 70, with 64 being optimal.

However, the greatly improved resolution and sensitivity offered by the techniques and apparatus of the invention have surprisingly shown that the attenuation characteristics of chirps directed upwards into the lower atmosphere appear to change between an altitude of about 1 and 2 km, say approximately 1.5 km for convenience. It appears from our investigations that attenuation below about 1.5 km obeys the inverse-square law appropriate to spherical wave propagation, but above that altitude, attenuation seems to be more or less linear; that is, vertical acoustic propagation in the atmosphere above about 1.5 km (to at least 15 km) appears to be planar. Thus according to another aspect of the present invention, we prefer to apply a constant to compensate for attenuation above about 1.5–2.0 km and a logarithmic function to compensation for attenuation below this altitude (as indicated in the preceding paragraph).

The amplitude signal derived from real or complex Fourier domain processing is one that is indicative of incremental change in reflectivity of the atmosphere with altitude (distance from the transmitter and receiver), 'reflectivity' being used to broadly indicate the capacity of the atmosphere to return an echo signal. This incremental or relative measurement technique using long pulse-compression chirps in combination with Fourier processing methods allows returns from large wind changes (as occur in wake vortices) to be readily detected and/or quantified in contrast to Doppler based methods which generally cannot handle the large Doppler shifts associated with such high wind speeds.

By transmitting two differently coded chirps (at the same time, using two transmitters or one after the other using one transmitter) the cumulative phase outputs can be manipulated to remove all common signals, and components due to cross-range wind, to allow generation of a further output that is indicative of variation of the speed of sound with range and, thus, variation of virtual temperature with range. Preferably, the two chirps are identical positive and negative linear phase chirps (eg, the positive one rising from 800 to 1600 Hz and the negative one descending from 1600 to 800 Hz at the same phase rate.

Thus, the last-mentioned aspect of the Invention provides a further large improvement in s/n, allowing much improved echo discrimination with respect to the art, despite listening while sending. Also, simultaneous echo reception and processing by multiple receivers greatly improves cycle time.

As already noted, it is desirable (but not necessary) to space multiple receivers equidistant from and near to a common transmitter so that each will be subject to the same ambient noise (as well as other common components). Generally, the louder and less uniform the noise environment, the nearer the receivers need to be to one another to ensure that each is subjected to the same environmental noise, as far as practicable. We have found that, in a noisy environment, the distance between a receiver and the transmitter should be of the order of meters. In a quiet environment, it can be of the order of 10 m.

DESCRIPTION OF EXAMPLES

Having portrayed the nature of the present invention, a particular example will now be described with reference to the accompanying drawings. However, those skilled in the art will appreciate that many variations and modifications can be made to the chosen example while conforming to the scope of the invention as defined in the following claims.

BRIEF SUMMARY OF THE DRAWINGS

In the accompanying drawings:

Turning to FIG. 1, the sodar system 10 of the first example includes a loudspeaker (transmitting acoustic transducer) 12 located within a surrounding acoustic shield 14 that is open only at the top, four microphones (receiving acoustic transducers) 16n, 16s, 16e and 16w spaced about speaker 12, each located within its own separate acoustic shield 18 that is also open only at the top. Microphones 16n, 16s, 16e and 16w are located equidistant from speaker 12 and respectively positioned on the cardinal points of the compass, North, South, East and West relative to loudspeaker 12. System 10 of the example is a compact monostatic system in which speaker 12 and microphones 16n, 16s, 16e and 16w are co-located;

Figure 1:
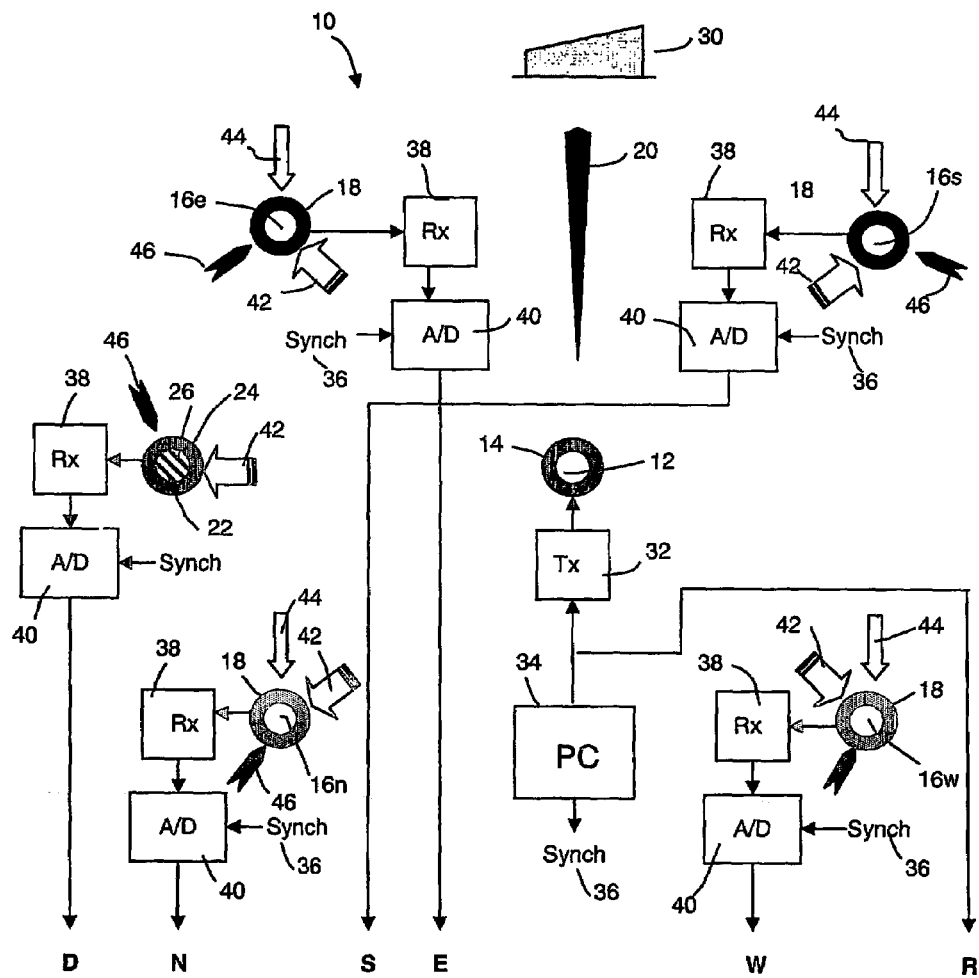
FIG. 1 is a diagrammatic plan view showing the basic components of the chosen example of sodar system for sounding the lower atmosphere, in which system multiple receivers are employed with a single transmitter.

that is, are within a few meters of one another, and may even be mounted on a single structure or reflecting dish (as disclosed in our copending international application PCT/AU02/001129, but not shown here).

Speaker 12 and its shield 14 are preferably arranged so that the acoustic output of the speaker is directed vertically upwards in a beam, diagrammatically indicated by black arrow 20, into the atmosphere. Microphones 16n, 16s, 16e and 16w and their shields 18 may also be arranged so as to preferentially receive sounds traveling downwards. If desired, microphones 16n and 16s may be angled slightly toward one another and microphones 16e and 16w may also be angled slightly toward one another. Care should be taken to ensure that all microphones are substantially identical, are shielded in substantially identical fashion and, if angled as just indicated, all have the same angle with respect to the transmission axis of speaker 12.

In this example, a fifth 'dummy' microphone 22 with acoustic shielding 24 is employed, microphone 22 being substantially identical to each of the other microphones 16n, 16s, 16e and 16w, being positioned at the same distance from speaker 12 as the other microphones, and, its shielding 24 being substantially identical to the shielding 18 of each other microphone. However, dummy microphone 22 differs in that it is-acoustically shielded, as indicated by cross-hatching 26, from sound arriving substantially vertically, shielding 26 being spaced vertically above both microphone 22 and shielding 24 so that local horizontally directed sounds are detected by microphone 22 in substantially the same manner as they are detected by the other microphones 16n, 16s, 16e and 16w. Thus, dummy microphone 22 is intended to receive the same direct signal and ambient noise interference as the other microphones, but not echoes or clutter interference returned from the atmosphere.

In this example, the sound output by loudspeaker 12 is in the form of a constant-amplitude linear chirp of 36 s duration that starts with a frequency of about 700 Hz and ends with a frequency of about 1600 Hz, the transition being effected by a smooth constant-rate phase-change. This chirp is indicated diagrammatically at 30 and is repeated once every 50–60 s during atmospheric sounding. Speaker 12 is powered by a driver circuit 32, which in turn receives its input from the sound card (not shown) of a computer or PC 34. PC 34 also generates a synch output 36 that, in this example, is a substantially square wave of 96 KHz.

The sound detected by each microphone 16n, 16s, 16e, 16w and 22 is output as an electrical analog signal and conditioned and amplified in a respective receiver circuit 38 in the conventional manner, the analog output of each respective receiver circuit 38 being time-sampled and converted to a digital signal in a respective analog-to-digital [A/D] converter 40. The sampling rate and timing is controlled by synch signal 36 from PC 34. In the present example, the sample rate for the output of each receiver 38 is 96 KHz and the precision of each sample is 32 bits.

In FIG. 1 direct signal interference received be each microphone 16n, 16s, 16e, 16w and 22 is indicated by large arrows 42. Direct signal 42 will not be identical with the propagated signal 20 because the acoustic shielding employed around the speaker and the microphones will attenuate certain frequency components more than others and will also cause some frequency-selective phase-shifts. Also, there is likely to be local reverberation present in the signals detected by the microphones that is not present in the transmitted chirp. The echoes (including clutter) returned from the atmosphere are indicated by small arrows 44, it being noted that no arrow 44 is shown at dummy microphone 22 because that microphone is shielded against vertically propagated sound. Since microphones 16n, 16s, 16e, 16w and 22 are all shielded in the same manner horizontally and positioned equidistant from speaker 12, the direct signal 42 received by each and the ambient noise signals—indicated by black arrows 46—received by each will be substantially identical. Of course, echoes 44 returned to each microphone 16n, 16s, 16e and 16w will not be identical because each microphone is 'looking at' a different part of the atmosphere.

Finally, it is to be noted that the 96 kHz stream of 32 bit samples that flow from each A/D circuit 40 is output separately: that derived from dummy microphone 22 is indicated at D and those derived from microphones 16n, 16s, 16e and 16w are indicated at N, S, E and W. A 32 bit, 96 KHz reference output stream, indicated at R, corresponds to the signal output by PC 34 to speaker driver 32, with or without a deliberately imposed time delay with respect to the signal actually fed to driver 32. Sample-streams N, S, E and W are preferably initiated at the start of the transmission of signal 20 and reference sample stream R is preferably generated without time-delay so that, for every sample in stream R, there is a corresponding sample in each of sample-streams N, S, E and W. However, it is essential that sample-streams N, S, E and W continue to be generated at the 96 KHz sample rate for some time after the transmitted chirp 30 and reference stream R have terminated, the time depending upon the desired range.

In this example, it will be assumed that the desired range is from about 10 m to a little over 1000 m. As sample-streams N, S, E and W continue to be generated (by virtue of the synch signals 36 continuing to be output from PC 34) for six seconds longer than the duration of chirp 30 (and, therefore, stream R), the maximum range is 6×340×0.5 or 1020 m [340 being assumed to be the speed of sound in air in m/s and the 0.5 factor allowing for the round trip of the echo]. Since, in this example, each chirp has a duration of 11 s, the total listening time (and therefore the duration of each of sample-streams N, S, E and-W) is 11 s following commencement of each transmitted chirp.

As already noted, sample-streams N, S, E and W contain faint returned echoes 44 along with heavy interference in the guise of direct signal 42 and ambient noise 46. Sample-stream D contains this interference but a negligible amount of echoes 44. As also noted, echoes 44 themselves contain interference in the guise of clutter due to reflections from moving objects in view. The selective removal or attenuation of these interference signals and the generation of the desired outputs from the faint echoes will now be described with particular reference to FIGS. 2 and 3.

Figure 2:
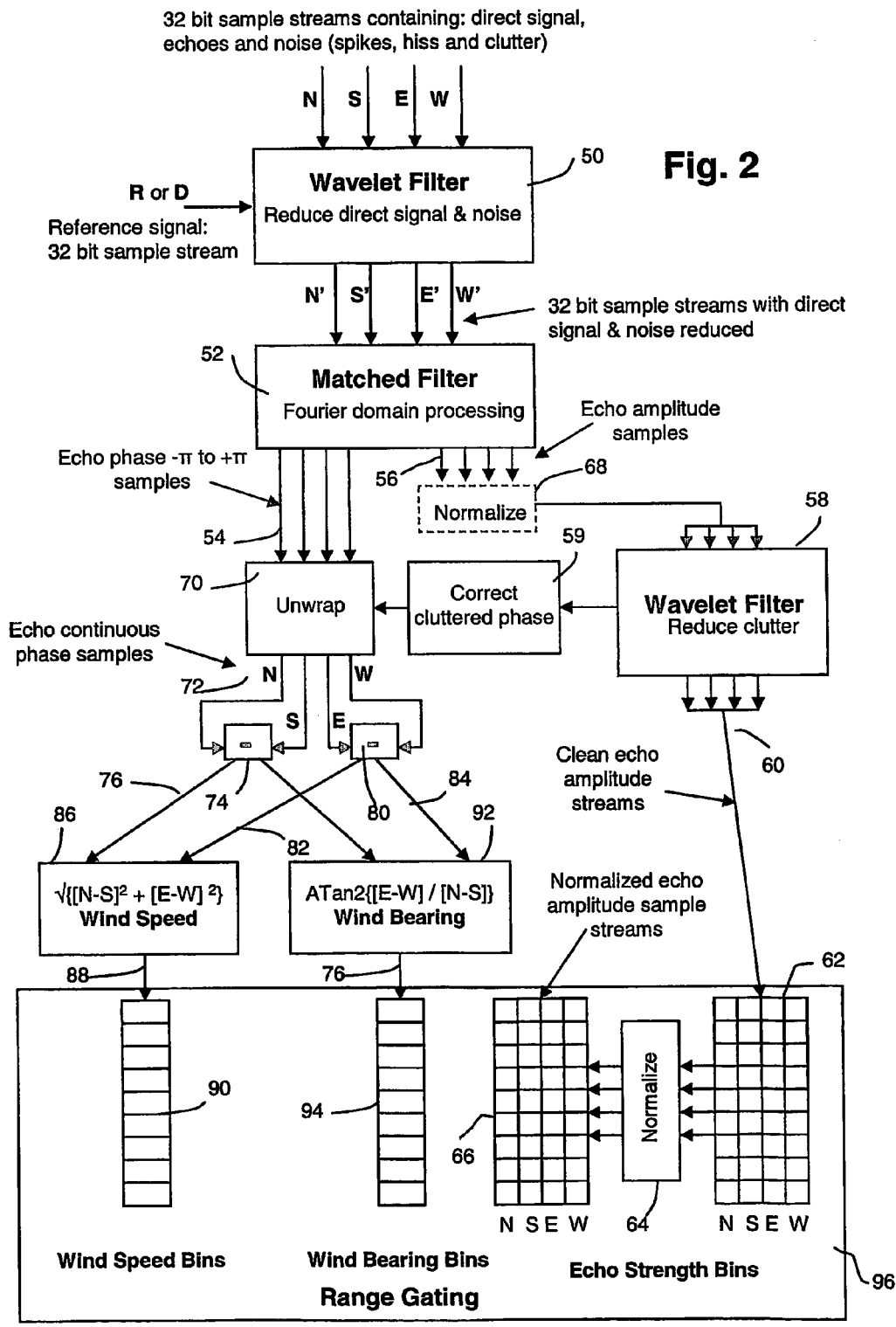
FIG. 2 is an overall system diagram illustrating the way in which the signals from the multiple receivers of FIG. 1 are processed in the chosen example.

With particular reference to FIG. 2, the N, S, E and W sample-streams from FIG. 1 are processed in parallel in a wavelet filter 50 to selectively reduce the direct-signal interference 42 (FIG. 1) and the ambient noise interference 46. This is done by using numerical wavelet methods to, first, compare the variation of each sample-stream N, S, E and W with the variation of the reference signal R or D to selectively reduce direct-signal interference, second, to identify and remove spike interference and, third, attenuate background rumble or hiss. The use of reference signal D in the reduction of direct-signal interference is preferred because it more closely resembles the direct-signal interference actually received by active microphones 16n, 16s, 16e and 16w. Suitable numerical wavelet processing methods are available from the commercial suite of DSP functions sold under the trademark MatLab The cleaned-up sample-streams N', S', E' and W' output from wavelet filter 50 are then fed to and processed in parallel by a matched filter 52 using Fourier-domain processing techniques to generate separate sampled echo phase and echo amplitude component streams—indicated at 54 and 56 respectively. Thus, the N phase component stream comprises a time-series of digital numbers in which each number indicates a phase value between $-\pi$ and $+\pi$ of each corresponding clean sample in sample-stream N' input into matched filter 52; the same applying to the S, E & W components of phase output streams 54. Each of N, S, E & W amplitude output streams 56 similarly comprise a series of digital numbers in which each number indicates the amplitude of the echo represented by the corresponding clean sample N', S', E' or W' input to matched filter 52. Of course, clutter interference is present in these phase and amplitude samples at this stage.

N, S, E and W amplitude samples 56 containing clutter interference are then put through a second wavelet filter 58 in which samples containing anomalous amplitude peaks corresponding to clutter are identified and adjusted (clipped) to conform in amplitude to neighboring samples. As it is highly likely that the corresponding phase samples 54 will also contain anomalous phase data, process 59 is used to store the identity (eg, the ordinal numbers) of the anomalous samples and to adjust the phase reading of the same phase samples 54 so that they conform to the phase of their neighboring samples. The manner in which this is done will be explained shortly. For now, it is to be noted that the four adjusted amplitude sample streams 60 output from second wavelet filter 58 are stored in a series of corresponding echo strength bins 62 for later display or study.

If desired, and as here preferred, it is wished to adjust the recorded amplitude of each sample stored in bins 62 to compensate for propagation loss, this may be done by normalization process 64 and each normalized amplitude sample is then stored in a corresponding series of normalized sample bins 66. Alternatively, the normalization process may occur earlier, as indicated by the process shown in broken lines at 68. Though we are uncertain of the theoretical explanation we have found by comparison of the results of atmospheric sounding using the process of the chosen example and the readings of radiosondes, that the amplitude of returned echoes tends to fall off logarithmically with range due to propagation losses up to an altitude of about 1200–1500 m. Strangely, after about 2000 m, the fall off tends toward linearity with range. Accordingly, in this example, the normalization process 64 or 68 applies these findings, by increasing the amplitude of amplitude samples in streams 56 logarithmically according to sample number until a sample number is reached that corresponds with a range of 1250 m, and then by increasing the amplitude recorded In each sample of streams 56 linearly as sample number further increases. Thus, taking the average speed of sound in air below an altitude of 1250 m to be 340 m/s and allowing for a round-trip of 2040 m, sample number $8.9 \times 10^5$ corresponds approximately to a range of 600 m. Logarithmic normalization was therefore applied up to sample number $7 \times 10^5$ and linear normalization was applied from $8.9 \times 10^5$ to $1.07 \times 10^6$, which approximates the number of samples taken in 11 s at 96 K/s (and approximates a range of 1020 m).

Returning now to the treatment of the instantaneous phase sample streams 54, as noted earlier each sample of each stream comprises a number that indicates the measured phase of that sample between $-\pi$ and $+\pi$. To derive outputs indicative of Doppler shift or wind speed at the range corresponding to sample number, each phase stream component (N, S, E and W) of phase samples 54 must be processed to generate an incremental or cumulative phase from the ground up. This is achieved by an 'unwrapping' process indicated at 70, which is again a known numerical DSP technique available in MatLab. Thus, N, S, E, and W streams of digital numbers 72 are output from unwrap process 70 indicative of the cumulative phase shift (ie, the Doppler component) of sample in each stream corresponding to each transmitted sample in beam 20. Before streams 70 are output, however, the cumulative phase of those samples that correspond to anomalous amplitude samples (indicative of clutter interference) are adjusted to conform with their neighbors by use of process 60.

While this 'raw Doppler' information is of value and can be used to plot horizontal wind speed at altitudes corresponding to each received sample, it contains significant 'Doppler noise' due to instantaneous variation in vertical wind speed at each altitude concerned. Since all receivers/microphones are looking at much the same part of the sky which can be assumed to have a roughly uniform vertical wind speed over a short period of time, this Doppler noise due to this vertical component of wind speed can be removed by differencing the cumulative N and S phase samples 72, sample by sample, in process 74 to give a net N-S phase sample stream. The N-S stream is duplicated an output as two identical N-S sample streams 76 and 78. The E and W sample streams 72 are similarly differenced in process 80 to give two identical net E-W velocity sample streams 82 and 84. Sample streams 76 and 82 are fed to process 86 from which the wind-speed for every sample is derived using the formula $\sqrt{\{[N-s]^2+[E-W]^2\}}$, to generate an output wind-speed sample stream 88 that is stored in wind-speed sample bins 90. Sample streams 78 and 84 are fed to process 92 from which wind bearing is derived using the formula $\mathrm{ATan2}\{[E-W]/[N-S]\}$ for every sample, and the wind-bearing sample stream 93 thus generated is loaded into bearing bins 94 for storage.

It will be appreciated that, in the processing of echo signals and the generation of wind speed, wind bearing and echo strength data for every sample of the received signal that is taken, there will be a very large number of bins 62, 66, 90 and 94 to store the results; for there are approximately $5.7 \times 10^5$ samples in the 11 s listening time of the chosen example. This large number of samples also results in heavy processing loads and significant processing times, even where a separate additional PC is used to process each received sample stream. The number of bins required can be usefully reduced by averaging (say) every 10, 50 or 100 samples in output streams 60, 88 and 93 and placing the average into a corresponding 'range bin' in a process that is often referred to as 'range gating'—generally indicated at 96 in FIG. 2. $5.7 \times 10$ samples for a range of 1020 m represents 564 samples per meter of range, range-gating at 10, 50 and 100 samples will give 56, 11, and 6 samples per range gate and reduce the number of bins accordingly. While processing loads can be similarly reduced by averaging signals at any earlier stage, this has been found to lead to inferior results and is not thought desirable.

Figure 3:
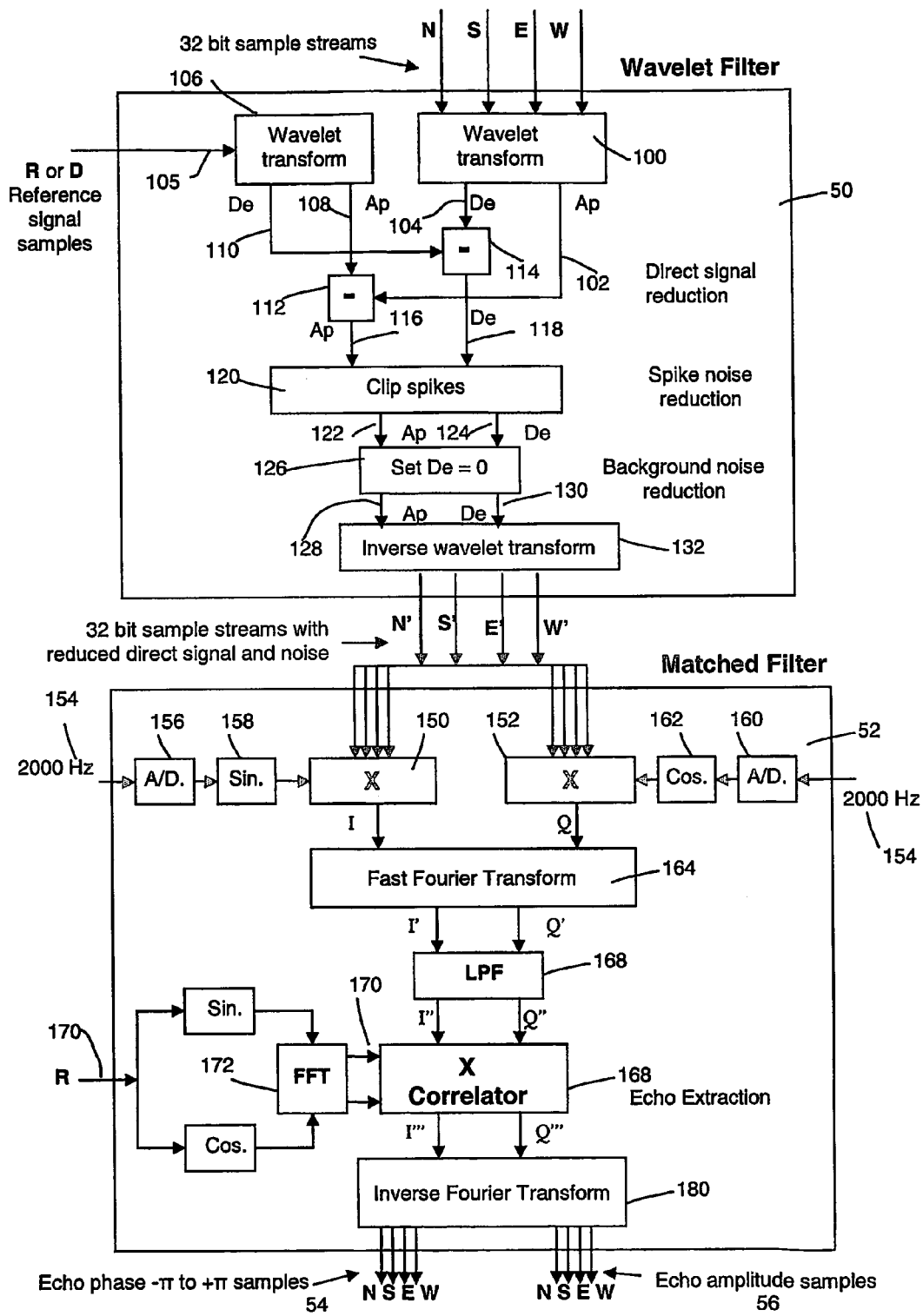
FIG. 3 is a more detailed block diagram of portion of FIG. 2.
Figure 4:
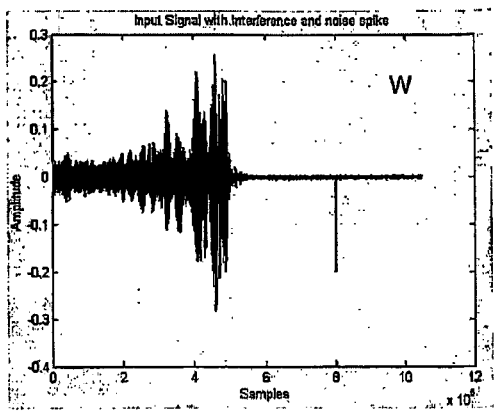
FIGS. 4–13 are graphs plotting amplitude (vertical axis) against sample number (horizontal axis), each graph being identified by numbers corresponding to reference numerals in FIGS. 2 and 3.

Turning now to FIG. 3, the functions of wavelet filter 50 and matched filter 52 will now be described in more detail. The N, S, E and W sample-streams derived from microphones 16*n*, 16*s*, 16*e*, and 16*w* input into wavelet filter 50 are transformed sample by sample into corresponding wavelet functions using Daubechies wavelet transforms in process 100. For each sample, an 'approximation' function and a 'detail' function is output, this being indicated at 102 and 104. The Input reference sample-stream R or D (and preferably D in this example) 105 is similarly transformed into a corresponding set of wavelet functions in process 106, an approximation function 108 and a detail function 110 being output for each sample. By differencing approximation functions 102 and 108 in process 112 and by differencing detail functions in process 114, net approximation and detail function sample streams 116 and 118 are generated (which are indicative of the original sample streams N, S, E and W with the direct signal attenuated.

A second stage of noise reduction in the 'wavelet domain' is effected by process 120 to reduce spike noise. Process 120 takes difference outputs 116 and 118 as inputs and uses detail output 118 to identify samples that suffer from spike noise and to then reduce the value of the amplitude of the same samples in the approximation input 116 to conform with the values of adjacent samples that are not effected by the noise spike. The spikes in the detail noise samples 118 are also reduced. The adjusted approximation output 122 and detail output 124 thus generated by function 120 are then fed to process 126, which performs a third stage of noise reduction—the attenuation of background hiss and rumble. Process 126 simply sets the amplitude of each sample of the detail sample stream 124 to zero. The input adjusted approximation 122 is then passed on substantially unchanged as output approximation sample stream 128, along with the zeroed detail stream 130 to an inverse wavelet transform function 132, thereby generating reconstituted 'clean' sample streams N', S', E' and W' that are the outputs of wavelet filter 50.

Noise-reduced sample streams N', S', E' and W' are output from wavelet filter 50 to matched filter 52 for the extraction of the phase and amplitude components using Fourier methods. Again, known fast-Fourier algorithms obtainable from sources such as Matlab can be used to effect the matched filter function. Input sample streams N', S', E' and W' are fed in parallel to two separate multipliers or 'mixers' 150 and 152. Each sample of each sample stream fed to multiplier 150 is multiplied with a corresponding numerical sample of the Sine of a 2000 Hz signal 154, and, each sample of each sample stream fed to multiplier 152 is multiplied with a corresponding numerical sample of the Cosine of the same 2000 Hz signal. While it will be appreciated by those skilled in the art that these Sine and Cosine functions can be generated entirely numerically without the need to sample analog 2000 Hz signals, FIG. 3 suggests the latter for the sake of clarity. Thus, it is assumed that analog signal 154 is sampled by AND converter 156 and that the Sine of each sample of the resultant stream is taken numerically in process 158 before being fed to multiplier 150. Similarly, it is assumed that signal 154 is sampled by AND converter 160 to generate a sample-stream that is then digitally converted in process 162 to the Cosine of each sample before feeding the resultant sample stream to multiplier 152. In this way (as is known in the art) the outputs of multipliers 150 and 152 together generate a complex representation of the input sample streams N', S', E' and W', output of multiplier 150 and output of multiplier 152 being sample streams comprising respectively the imaginary components I and the real components Q of input sample streams N', S', E' and W'.

Each entire complex sample stream N', S', E' and W' is then converted into the Fourier domain by the use of a fast Fourier transform function 164. The transform is then fed as a complex sample stream I', Q' through a low-pass filter 166 to remove upper sideband components, the lower sideband output I'', Q'' then being fed to a correlator or complex multiplier 168 where it is multiplied with the complex output, generally indicated at 170, of the Fourier transform of the reference sample stream R (the chirp signal generated by PC 34) indicated at 171. The latter transform is generated by process 172 which receives the Sine and Cosine components of sample stream R. The complete complex output I''', Q''' signal streams of correlator 168 are then fed to and accumulated by inverse fast-Fourier process 180 from which time-domain signal streams 54 and 56 (see FIG. 2) are generated, which streams it will be recalled contain phase and amplitude information (respectively) corresponding to each input sample of sample streams N, S, E and W of FIG. 1.

As noted above, phase and amplitude streams 54 and 56 output from matched filter 52 still contain clutter noise that could not be removed in wavelet filter 50. Once separate phase and amplitude sample streams have been extracted, however, anomalous signals can be removed using second wavelet filter 58 (FIG. 2). Since this filter is substantially the same as filter 50, except that it does not need the direct signal reduction step, it is not separately illustrated. Separate wavelet transforms of the N, S, E & W amplitude streams 56 are taken in a process equivalent to process 100 in filter 50 and amplitude samples with anomalous spike noise are identified in a process equivalent to process 120 in filter 50. In this process, the anomalous spike noise is reduced—clipped—and the adjusted amplitude sample streams subjected to an inverse wavelet transform in a process equivalent to process 132 of filter 50 before being output from filter 58 as clean echo amplitude streams 60 (FIG. 2).

As previously noted, the identity of anomalous samples located in filter 58 is sent to process 59 and used by that process to adjust the corresponding unwrapped phase generated by process 70.

FIGS. 4–14 are graphs that illustrate the signal at various points in the wavelet filter 50 of FIG. 3, the graphs being plots of sample amplitude (vertical axis) against sample number (horizontal axis). The graphs of FIGS. 1–14 are marked with letters or numbers in the right hand upper corner to identify the locations in FIG. 3 where the signals are taken from. These Figures were derived from tests using a transmitted chirp of 500K samples and a listening time of 1050K samples that starts with the start of the chirp.

Figure 5:
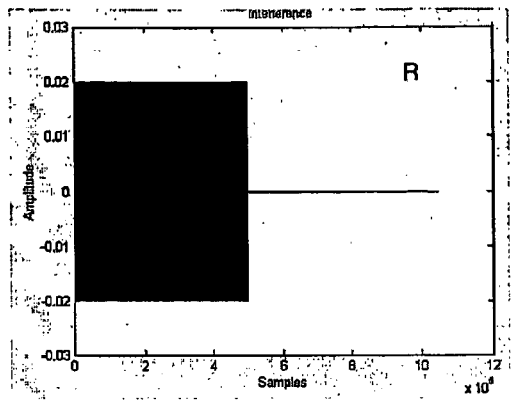
Figure 6:
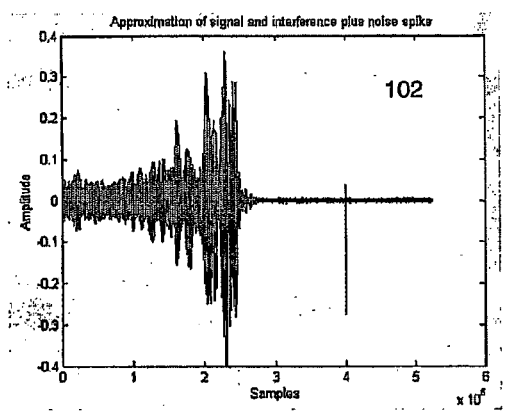
Figure 7:
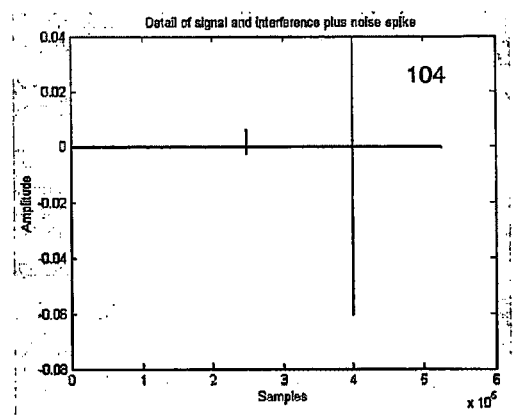
Figure 14:
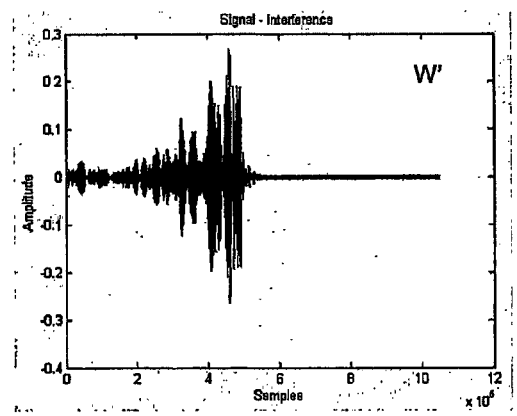
FIG. 14 is a graph representing the W sample stream input.

FIG. 14 represents the W sample stream input to wavelet transform process 100 in FIG. 3, showing the dominance of the direct signal in the first 500K samples of the W return. A sharp noise spike is present in samples at or near number 800K. FIG. 5 illustrates the sample stream R of the transmitted chirp input to wavelet transform process 106, showing a large constant amplitude during the entire transmission period of about 500K samples. FIG. 6 is the wavelet transform approximation 102 sample stream output from transform process 100, again evidencing the direct signal and the noise spike; while FIG. 7 is the detail sample stream 104 from the same process, highlighting the obvious noise spike but revealing another smaller noise pulse at about the 5K sample number. [Note that, for technical reasons associated with the wavelet transform process, the sample numbers of the detail outputs are half those of the approximation outputs.]

Figure 8:
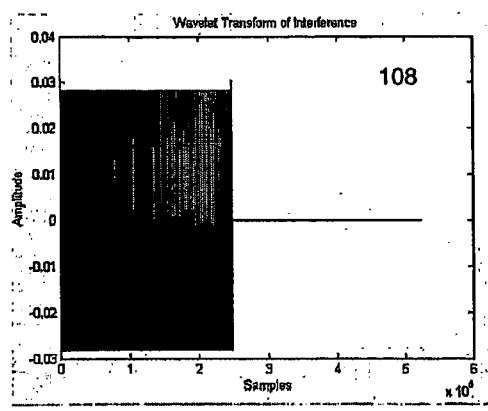
Figure 9:
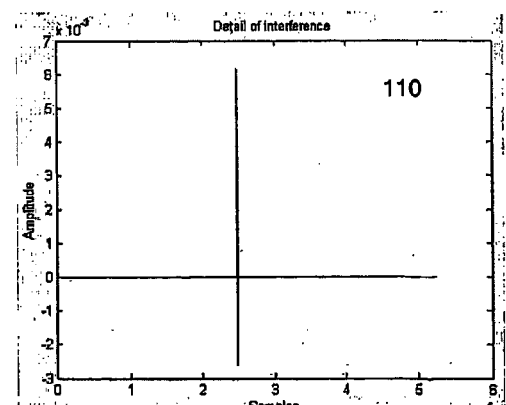
Figure 10:
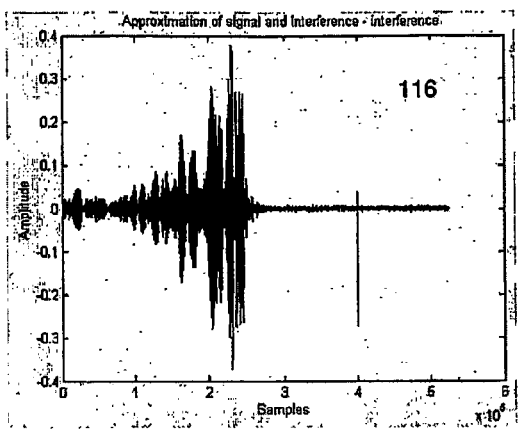
Figure 11:
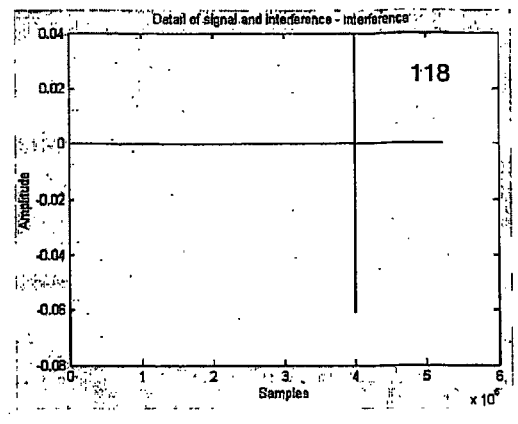
Figure 12:
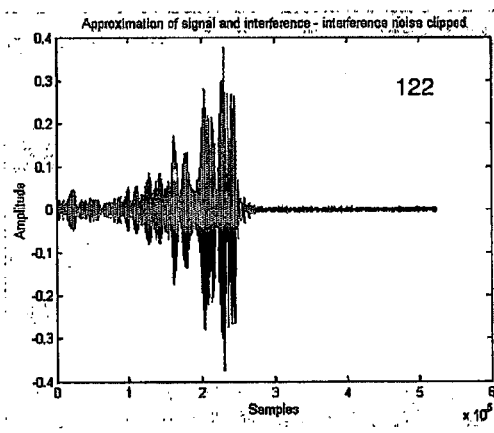
Figure 13:
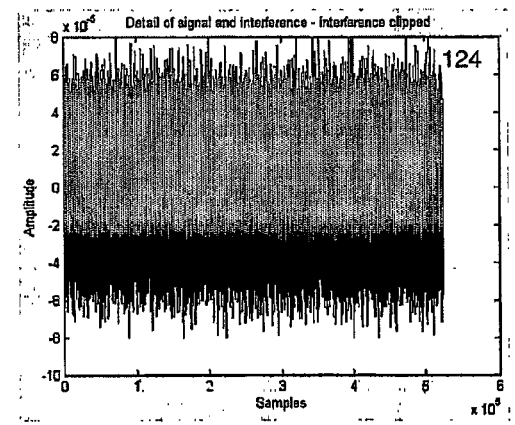

FIGS. 8 and 9 are the approximation and detail outputs 108 and 110 (respectively) of the wavelet transform of sample stream R, it being seen that the reference chirp leads to a sharp peak in the region of the 250K samples. FIGS. 10 and 11 are the differenced approximation and detail sample streams 116 and 118, most of the direct signal having been removed from stream 116, but the noise spike still evident in 118. The amplitude of the noise spike in FIG. 11 is used as a conditional test in order to clip both the approximation and the detail signals in process 120, yielding the clipped approximation sample stream 122 of FIG. 12 and the clipped detail sample stream 124 of FIG. 13, this sample stream (124) then being zeroed in process 126 before the inverse wavelet transform is performed in process 132 to yield the noise-reduced normal output W'.

Figure 15:
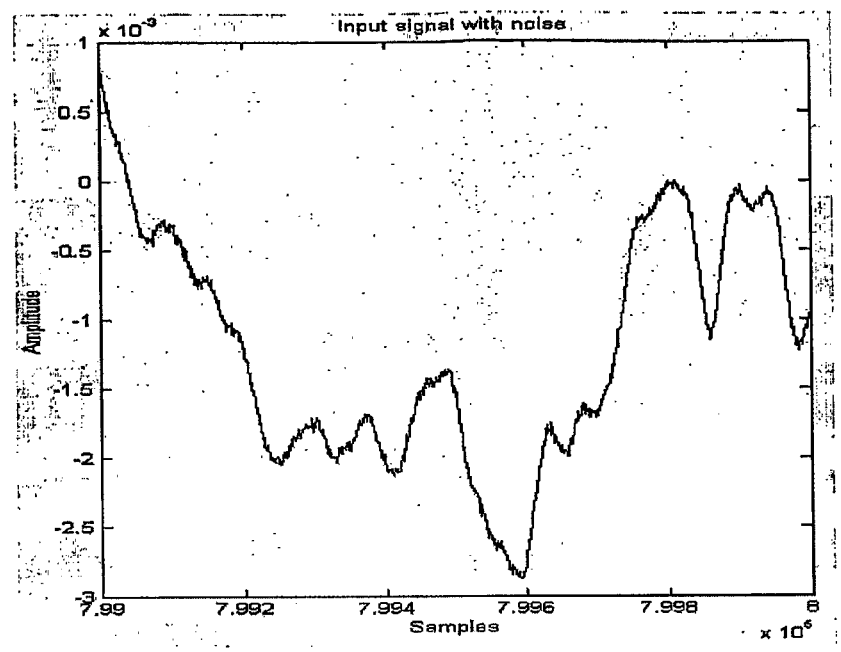
FIGS. 15 and 16 are a graphs showing the amplitude of an input sample signal stream to the matched filter against sample number with and without the use of wavelet filtering, respectively.
Figure 16:
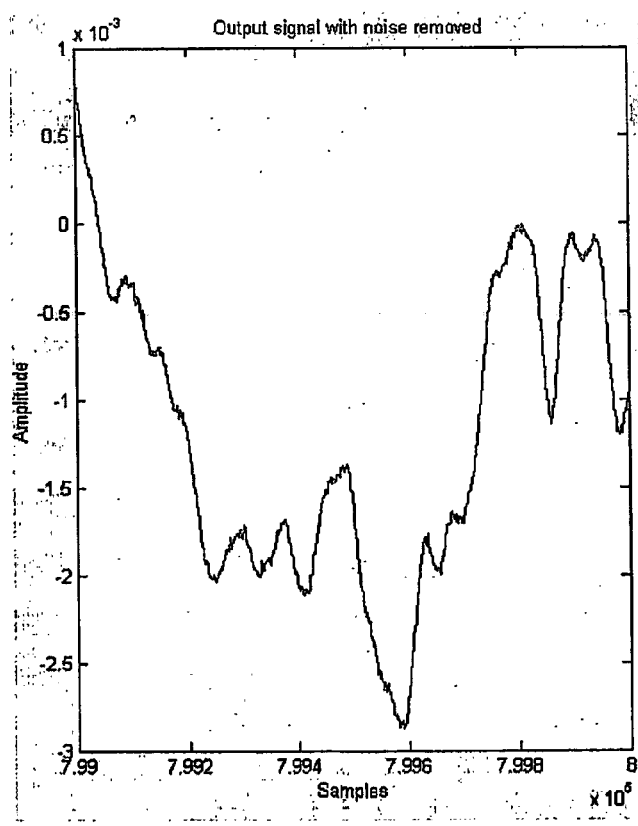

FIGS. 15 and 16 show the s/n gain achieved by the process 126 by which residual hiss-noise is reduced, FIG. 15 being the sample stream W' without the use of process 126 and FIG. 16 being the signal W' with the use of process 126; the s/n of the signal of FIG. 15 being 30 dB while that of the signal of FIG. 16 being 40 dB.

Figure 17:
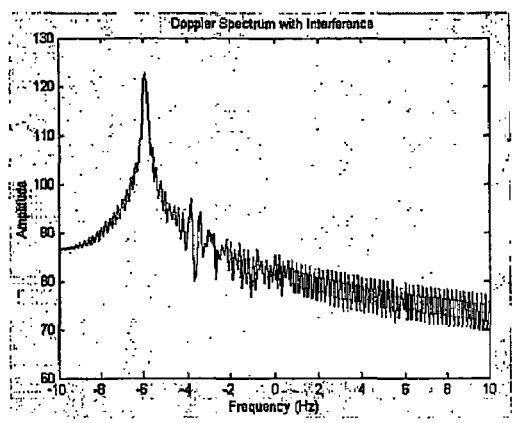
FIGS. 17 and 18 are graphs showing the Doppler spectrum of the phase output from the matched filter with and without interference attenuation in the manner disclosed.
Figure 18:
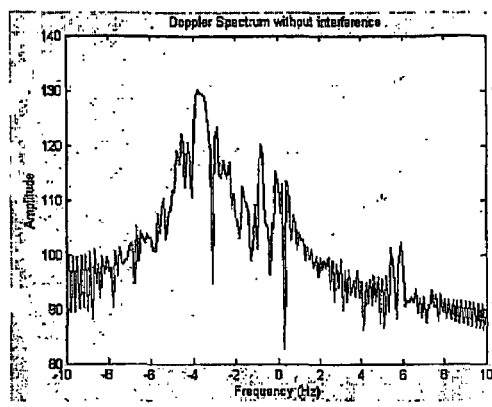

FIGS. 17 and 18 show the benefit of using the wavelet filter 50 on the measurement of (say) the wind speed at (say) 600 m; that is, on the samples 88 in range gate 90 [FIG. 2) corresponding to 600 m altitude. FIG. 17 is the Doppler signal indicated in this range gate without the use of wavelet filter 50 and FIG. 18 is the same signal with the use of filter 50.

Figure 19:
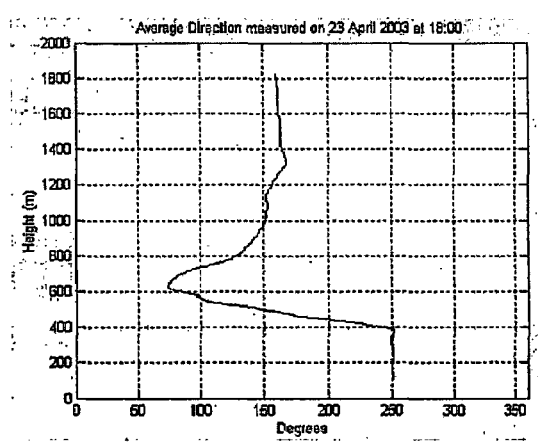
FIGS. 19 and 20 are graphs showing the variation of bearing and wind speed with altitude taken on a sample day from respective wind bearing bins and wind speed bins.
Figure 20:
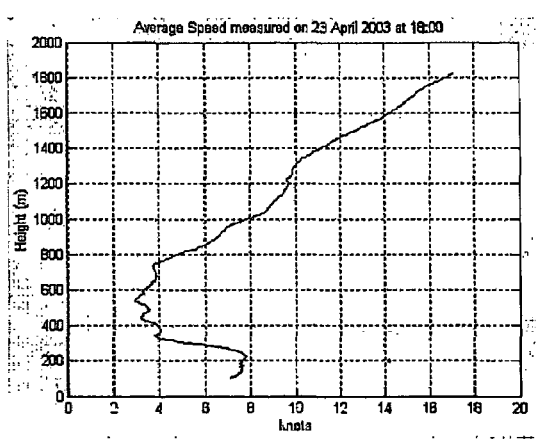
Figure 21:
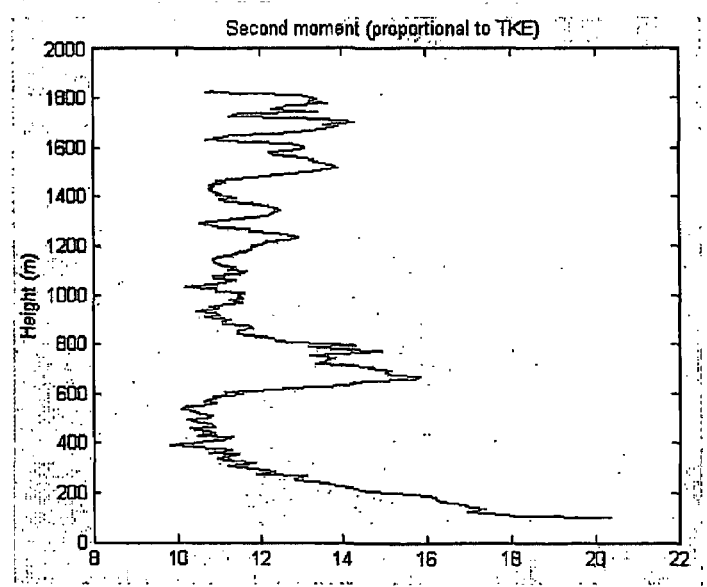
FIG. 21 is a graph of total kinetic energy with altitude computed from the phase and amplitude outputs of the example by using conventional techniques.

FIGS. 19 and 20 show respectively, the variation of bearing and wind speed with altitude on a particular day taken from wind bearing bins 94 and wind speed bins 90 of FIG. 2. This data can be used, as is known in the art, to compute the second moment of wind energy variation with altitude, which is proportional to the important parameter of total kinetic energy [TKE]. FIG. 21 illustrates the results of this computation using the data from FIGS. 19 and 20.

Figure 22:
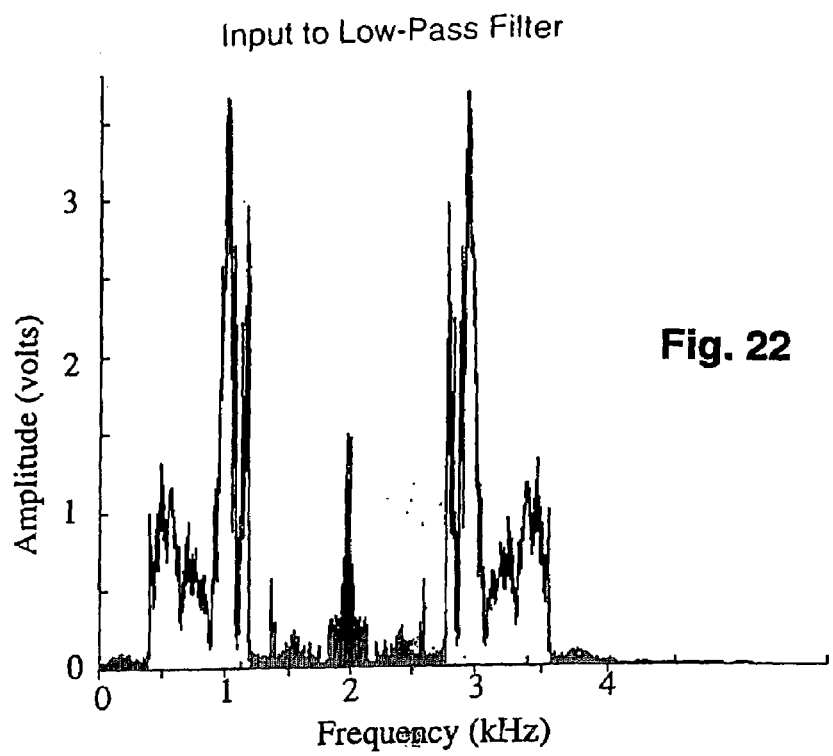
FIG. 22 is a graph of amplitude against frequency for the real signal component input into the low pass filter of the matched filter.
Figure 23:
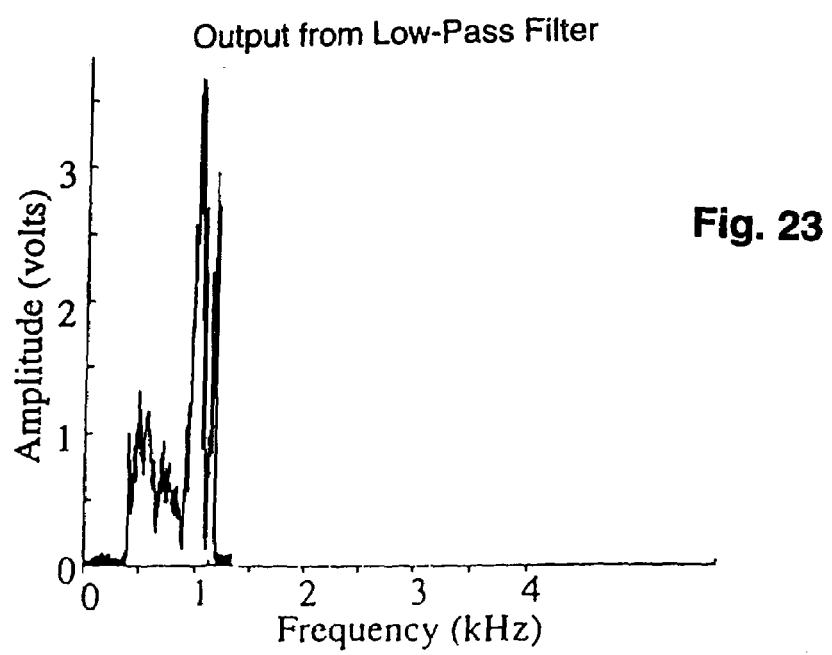
FIG. 23 is a graph of amplitude against frequency for the real component output from the low pass filter of the matched filter.

FIG. 22 illustrates an example of the real component Q' input to from low-pass filter 168 of matched filter 52 (see FIG. 3) and FIG. 23 illustrates the real component Q''' output to from low-pass filter 168 of matched filter 52 for the input shown in FIG. 22.

Figure 24:
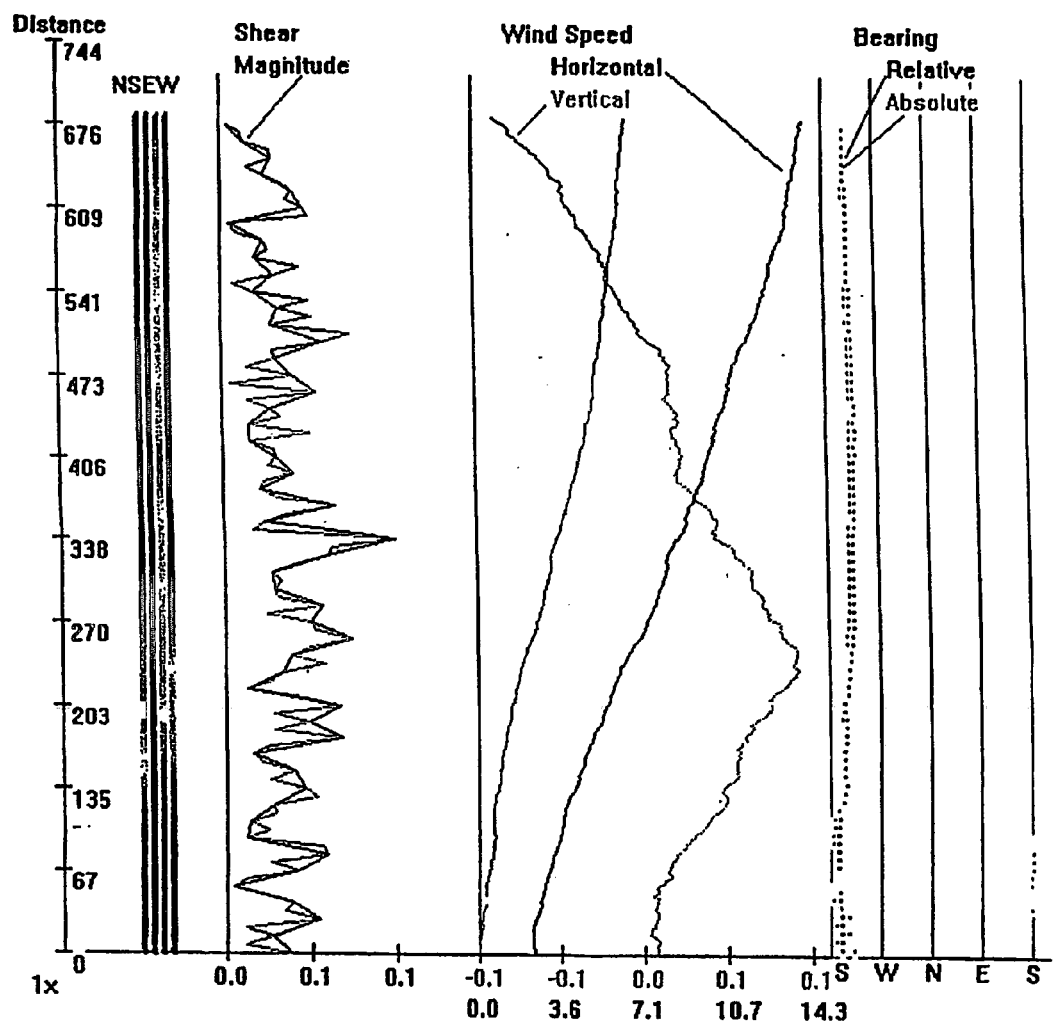
FIG. 24 is an example of the type of atmospheric data that can be produced by the example described.
Figure 25A:
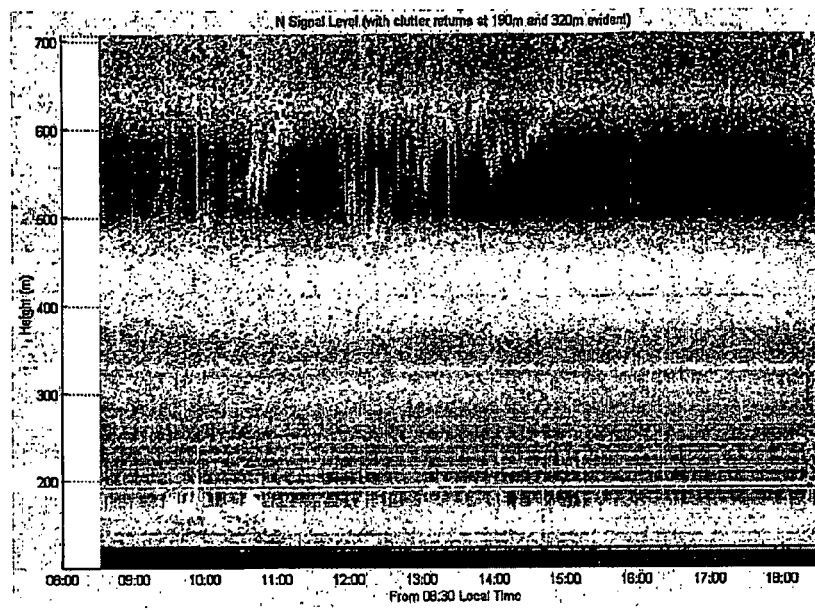
FIGS. 25A and 25B are printouts of processed returned signals from one receiver of the system of the example with and without clutter removal, respectively.
Figure 25B:
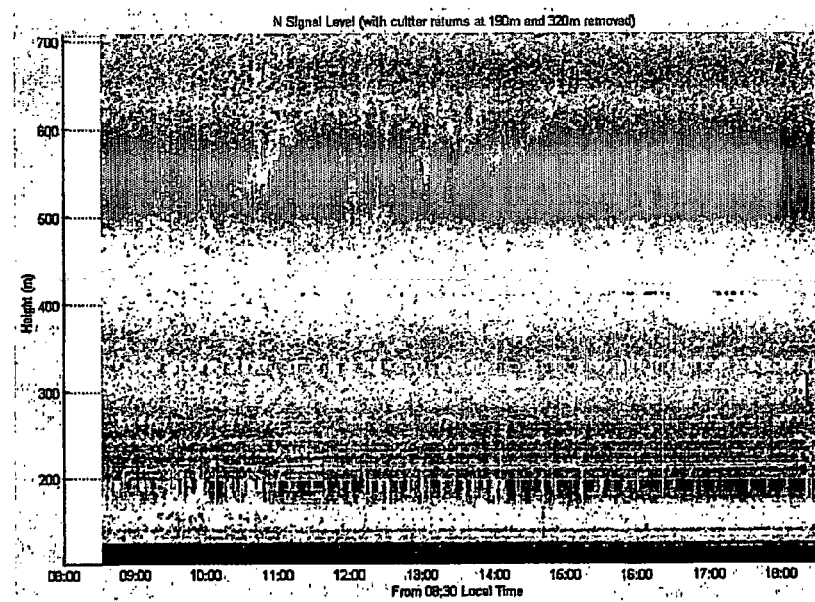
Figure 26:
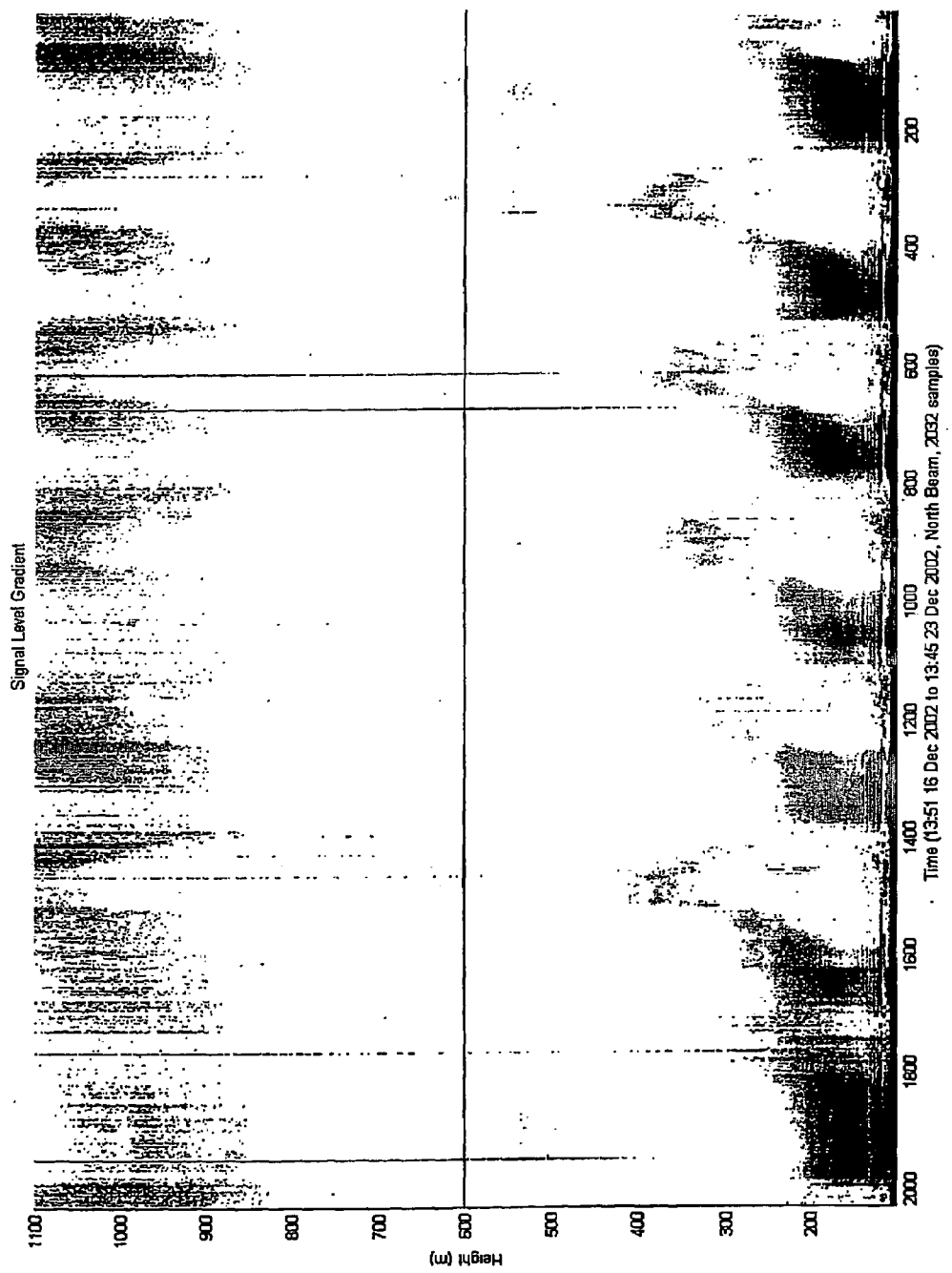
FIG. 26 is a printout of a long term sounding using the chosen example, plotting the gradient of the amplitude return of one receiver over a period of about six days.

FIG. 24 provides an overview display of the data generated by the system 10 of FIGS. 1–3, showing the variation with altitude up to 744 m of the N, S, E, W signal amplitudes, the wind-shear magnitude, the horizontal wind speed and the wind bearing. FIGS. 25A and 25B are actual plots of repeated soundings by two substantially identical systems over about 12 hours on the same day with altitude on the vertical axis and time on the horizontal, the normalized amplitude of echo returns in bins 66 of range gate 96 being indicated by shades of grey. [As these are reproductions of color printouts much detail has been lost.] FIG. 25A shows the returns without clutter removal by wavelet filter 58, clutter being evident at 190 and 320 m. FIG. 25B shows the returns with clutter removal by wavelet filter 58. FIG. 26 plots altitude and time for a period of about six days, with the first derivative of amplitude samples being show in shades of grey.

The computation demands of the receiver subsystems of the example can be substantial and are likely to justify dedicating a PC to process the signals from each receiver and using another PC to generate the chirp signal and to serve as a controller.

The invention claimed is:

1. A method for acoustically sounding the lower atmosphere over an altitude range using acoustic transmitter means and receiver means, the receiver means including a first acoustic transducer, the method comprising the steps of:
    employing the transmitter means to propagate an acoustic chirp into the lower atmosphere over said range along an axis of propagation,
    employing the first transducer to detect acoustic echoes of said chirp returned from the atmosphere both during and after the transmission of the chirp, said first transducer thereby also detecting acoustic interference including the direct transmission of the chirp, ambient noise and echo clutter, and employing the first transducer to generate a first analog electronic received signal representative of said detected echoes and interference,
    sampling said first analog received signal to generate a first input stream of digital samples representative of the instantaneous amplitude of the first analog received signal including signal components due to said interference,
    generating a complex Fourier transform of said first input stream of digital samples,
    correlating said complex Fourier transform of said first input stream of digital samples with a complex Fourier transform of the chirp to generate a correlated transform,
    generating an inverse Fourier transform of the correlated transform so as to generate an output stream of amplitude samples indicative of the strength of reflective or refractive anomalies with respect to range.

2. A method according to claim 1, including the step of:
    generating an inverse Fourier transform of the correlated transform so as to generate an output stream of phase samples indicative of wind characteristics with respect to range.

3. A method according to claim 1, including the step of putting said first input sample stream through a wavelet filter to attenuate direct signal and ambient noise components of said interference before generating said complex Fourier transform of said first input stream of digital samples.

4. A method according to claim 1, including the step of:
    generating a modified first input stream of digital samples wherein said signal components due to said interference in said first input stream of digital samples include direct signal components and wherein said direct signal components of said interference in said first input stream of digital samples are attenuated, and
    using said modified first input stream to generate said complex Fourier transform of said first input stream of digital samples; said step of generating said modified input stream including the sub-steps of:
    performing a wavelet transformation of said first input stream of digital samples to generate separate received wavelet approximation and received wavelet detail streams of samples,
    performing a wavelet transformation of a stream of digital samples of said transmitted chirp to generate separate wavelet chirp approximation and wavelet chirp detail streams of samples,
    differencing corresponding ones of said received wavelet approximation samples and said chirp approximation samples to generate a stream of differenced wavelet approximation samples,
    differencing corresponding ones of said received wavelet detail and said chirp wavelet detail samples to generate a stream of differenced wavelet detail samples,
    performing an inverse wavelet transformation of said streams of differenced wavelet approximation and differenced wavelet detail samples to generate said modified first input stream of digital samples in which the aforesaid direct signal components of said interference are attenuated.

5. A method according to claim 1, wherein said receiver means includes a dummy acoustic transducer similar to said first transducer and wherein said dummy and first acoustic transducers are arranged at substantially the same distance from the transmitter means, said dummy transducer means being acoustically shielded from atmospheric echoes but being similarly adapted to receive said direct signal and ambient noise components of said interference as the first transducer, and wherein the method of claim 1 includes the step of:

generating a modified first input stream of digital samples wherein the direct signal and ambient noise components of said first input stream of digital samples are attenuated, and using said modified first input stream to generate said complex Fourier transform of said first input stream of digital samples, said step of generating said modified input stream including the sub-steps of:

performing a wavelet transformation of said first input stream of digital samples to generate separate received wavelet approximation and received wavelet detail streams of samples, employing said dummy transducer to generate a dummy analog electronic received signal representative of said direct transmission and noise received by said dummy transducer, sampling said dummy analog signal to generate a dummy stream of digital samples representative of the instantaneous amplitude of the dummy analog signal including signal components due to direct signal and ambient noise interference, performing a wavelet transformation of said dummy stream of digital samples to generate separate dummy wavelet chirp approximation and dummy wavelet chirp detail streams of samples, differencing corresponding ones of said received wavelet approximation samples and said dummy approximation samples to generate a stream of differenced wavelet approximation samples, differencing corresponding ones of said received wavelet detail and said dummy wavelet detail samples to generate a stream of differenced wavelet detail samples, performing an inverse wavelet transformation of said streams of differenced wavelet approximation and differenced wavelet detail samples to generate said modified first input stream of digital samples in which the aforesaid direct signal and ambient noise interference components are attenuated.

6. A method according to claim 1, including the step of putting the output stream of amplitude samples through an amplitude wavelet filter to effect clipping of anomalous ones of said amplitude samples indicative of clutter components of interference.

7. A method for acoustically sounding the lower atmosphere over an altitude range using acoustic transmitter means and receiver means, the method comprising the steps of:

employing the acoustic transmitter means to transmit an acoustic chirp into the lower atmosphere down-range, employing the acoustic receiver means to detect acoustic input signals and to generate a receiver output that is representative of said input signals, said acoustic input signals and said receiver output each including components due (i) to echoes of said chirp returned from the atmosphere during and after the transmission of the chirp, (ii) interference including a direct chirp signal received direct from the transmitter means without being returned from the atmosphere, ambient acoustic noise and returned echo clutter components, and employing a matched filter to extract echo information and to generate therefrom signal amplitude and/or phase data indicative of atmospheric anomalies with respect to range.

8. A method according to claim 7 including the step of putting said receiver output through a wavelet filter to attenuate direct signal and ambient noise components of said interference before employing said matched filter.

9. A method according to claim 7 including the step of putting said signal amplitude data through a wavelet filter to attenuate clutter components of said interference.

10. A method according to claim 7 including the step of generating a modified receiver output having attenuated interference components before employing said matched filter, the step of generating said modified receiver output including the sub-steps of:

performing a wavelet transformation of said receiver output to generate received wavelet approximation and received wavelet detail signals, performing a wavelet transformation of said transmitted chirp to generate wavelet chirp approximation and wavelet chirp details signals, differencing said received wavelet approximation signals and said wavelet chirp approximation signals to generate a differenced wavelet approximation signal, differencing corresponding ones of said received wavelet detail and said wavelet chirp detail signals to generate a differenced wavelet detail signal, performing an inverse wavelet transformation of said differenced wavelet approximation and differenced wavelet detail signals to generate said modified first input stream of digital samples in which the aforesaid direct signal interference components are attenuated.

11. A method according to claim 7 including the steps of:

using the receiver means to detect first acoustic inputs, including echoes returned in a first direction from the transmitted chirp, to generated a first receiver output related to said first acoustic inputs, using the receiver means to detect second acoustic inputs, including echoes returned in a second direction from the transmitted chirp, to generate a second receiver output related to said second acoustic inputs, said second direction being substantially opposite to said first direction, employing said matched filter to generate a first phase signal comprising phase-related components from said first receiver output, employing said matched filter to generate a second phase signal comprising phase-related components from said second receiver output, manipulating said first said and second phase signals to generate data relating air characteristics in range.

12. Means for use in acoustically sounding the lower atmosphere over an altitude range, comprising:

acoustic transmitter means, transmitter driver means for generating an acoustic chirp signal and causing said chirp signal to be propagated into the atmosphere by said transmitter means, acoustic receiver means adapted to detect echoes of said propagated chirp signal while chirp propagation is in progress and adapted to generate an input signal representative of said detected echoes and accompanying interference including a direct chirp signal detected without reflection from the atmosphere and including ambient noise and echo clutter, wavelet filter means connected to receive said input signal and to receive an electronic reference copy of the chirp signal, said filter means being adapted to use said copy to attenuate the detected direct signal in said input signal to generate a modified input signal, and matched filter means connected to receive both said reference signal and said modified signal to extract phase and amplitude data therefrom, said data being indicative of the characteristics of the atmosphere within range.

13. Means for use in acoustically sounding the lower atmosphere over an altitude range, comprising:

acoustic transmitter means, transmitter driver means for generating an acoustic chirp signal and causing said chirp signal to be propagated into the atmosphere by said transmitter means, first acoustic receiver means adapted to detect echoes of said propagated chirp signal while chirp propagation is in progress and adapted to generate a first input signal representative of said detected echoes and accompanying interference including a direct chirp signal detected without reflection from the atmosphere and including ambient noise and echo clutter, matched filter means connected to receive the input signal and an electronic copy of the chirp signal from the driver and adapted to extract an echo amplitude signal therefrom, and wavelet filter means connected to receive said amplitude signal and said filter means being adapted to clip anomalous amplitude signals in the wavelet domain to reduce echo clutter in the amplitude signal.

\* \* \* \* \*